United States Patent
Mihan

(10) Patent No.: US 7,579,416 B2
(45) Date of Patent: Aug. 25, 2009

(54) CATALYST SYSTEM FOR OLEFIN POLYMERIZATION

(75) Inventor: Shahram Mihan, Bad Soden (DE)

(73) Assignee: Basell Polyolefine GmbH, Wesseling (DE)

( * ) Notice: Subject to any disclaimer, the term of this patent is extended or adjusted under 35 U.S.C. 154(b) by 3 days.

(21) Appl. No.: 10/583,065

(22) PCT Filed: Dec. 22, 2004

(86) PCT No.: PCT/EP2004/014609

§ 371 (c)(1),
(2), (4) Date: Jun. 15, 2006

(87) PCT Pub. No.: WO2005/063829

PCT Pub. Date: Jul. 14, 2005

(65) Prior Publication Data

US 2007/0149386 A1    Jun. 28, 2007

Related U.S. Application Data

(60) Provisional application No. 60/548,019, filed on Feb. 25, 2004.

(30) Foreign Application Priority Data

Dec. 23, 2003 (DE) ................................ 103 61 505

(51) Int. Cl.
C08F 4/22 (2006.01)
C08F 4/69 (2006.01)
B01J 31/34 (2006.01)

(52) U.S. Cl. .................. 526/172; 526/161; 526/154; 526/169; 526/169.1; 502/103; 502/132

(58) Field of Classification Search .............. 526/155, 526/154, 158, 160, 170, 943, 130, 172, 161; 502/113, 103; 524/154
See application file for complete search history.

(56) References Cited

U.S. PATENT DOCUMENTS

| 5,384,299 | A | 1/1995 | Turner et al. | 502/155 |
| 5,455,366 | A | 10/1995 | Rohrmann et al. | 556/8 |
| 5,830,821 | A | 11/1998 | Rohrmann et al. | 502/117 |
| 5,895,771 | A * | 4/1999 | Epstein et al. | 502/103 |
| 6,221,941 | B1 * | 4/2001 | Strauss et al. | 524/176 |
| 6,255,418 | B1 | 7/2001 | Jolly et al. | 526/160 |
| 6,455,650 | B1 * | 9/2002 | Lipian et al. | 526/171 |
| 6,583,238 | B1 * | 6/2003 | Gores et al. | 526/127 |
| 6,784,261 | B1 | 8/2004 | Schopf et al. | 526/16 |
| 2004/0214970 | A1 | 10/2004 | Schopf et al. | 526/159 |

FOREIGN PATENT DOCUMENTS

| DE | 19710615 | 3/1997 |
| EP | 558158 | 9/1993 |
| EP | 573 403 A2 * | 12/1993 |
| EP | 520732 | 12/1995 |
| EP | 427697 | 5/1996 |
| EP | 549900 | 8/1996 |
| WO | 98/22486 | 5/1998 |
| WO | 98/27124 | 6/1998 |
| WO | WO 99/50312 A1 * | 10/1999 |
| WO | 00/31090 | 6/2000 |
| WO | 01/09148 | 2/2001 |

OTHER PUBLICATIONS

Ivanova et al. Chem. Eur. J. 2001, 7(2), 503-510.*
I. Krossing, "The Facile Preparation of Weakly Coordinating Anions: Structure and Characterisation of Silverpolyfluoroalkoxyaluminates AgAl $(OR_F)_4$, Calculation of the Alkoxide Ion Affinity," 7, No. 2, p. 490-502 (2001).
L. Resconi, "Selectivity in Propene Polymerization with Metallocene Catalysts," Chem. Rev., vol. 100, No. 4, p. 1253-1345 (2000).
P. Jutzi, "Cyclopentadienyl compounds with nitrogen donors in the side-chain," Journal of Organometallic Chemistry, 369, p. 359-370 (1989).
H. Brintzinger et al., *ansa*-Metallocene derivatives; XVII. Racemic and *meso* diastereomers of group IV metallocene derivatives with symmetrically substituted, dimethylsilanediyl-bridged ligand frameworks. Crystal structure of $R, S\text{-}Me_2Si\,(3\text{-}t\text{-}Bu\text{-}5\text{-}MeC_5\text{-}H_2)\,_2ZrCl_2$; Journal of Organometallic Chemistry, vol. 369, p. 359-370 (1989).
G. J. P. Britovsek et al., "Novel olefin polymerization catalyst based on iron and cobalt," Chem. Commun., p. 849-850 (1998).
M. Enders et al., "8-Quinolylcyclopentadienyl, a Ligand with a Tailored Fit for Chelate Complexes," Chem. Ber., 129, p. 459-463 (1996).
B. L. Small, Highly Active Iron and Cobalt Catalysts for the Polymerization of Ethylene, : J. Am. Chem. Soc. , 120, p. 4049-4050 (1998).

* cited by examiner

*Primary Examiner*—David Wu
*Assistant Examiner*—Rip A. Lee
(74) *Attorney, Agent, or Firm*—William R. Reid

(57) ABSTRACT

The present invention relates to a catalyst system for olefin polymerization comprising an organic transition metal compound and, as cocatalyst, an ionic compound made up of anions of the formula (Ia), $$[Al(OR^1)_4]^- \tag{Ia}$$

where
the radicals $R^1$ are identical or different and are each, independently of one another, a radical $R^2R^3(CF_3)_2$,
$R^2$ is a carbon or silicon atom and
$R^3$ is hydrogen, $C_1\text{-}C_{20}$-alkyl, $C_1\text{-}C_{20}$-fluoroalkyl, $C_6\text{-}C_{20}$-aryl, $C_6\text{-}C_{20}$-fluoroaryl, $C_7\text{-}C_{40}$-arylalkyl, $C_7\text{-}C_{40}$-fluoroarylalkyl, $C_7\text{-}C_{40}$-alkylaryl, $C_7\text{-}C_{40}$-fluoroalkylaryl or an $SiR^4_3$ group, where
$R^4$ may be identical or different and is each $C_1\text{-}C_{20}$-alkyl, $C_1\text{-}C_{20}$-fluoroalkyl, $C_6\text{-}C_{20}$-aryl, $C_6\text{-}C_{20}$-fluoroaryl, $C_7\text{-}C_{40}$-arylalkyl, $C_7\text{-}C_{40}$-fluoroarylalkyl, $C_7\text{-}C_{40}$-alkylaryl or $C_7\text{-}C_{40}$-fluoroalkylaryl,
and Lewis-acid cations or Brönsted acids as cations.

In addition, the invention relates to the process for preparing such a catalyst system and to a process for the polymerization of olefins in which this catalyst system is used.

5 Claims, No Drawings

CATALYST SYSTEM FOR OLEFIN POLYMERIZATION

This application is the U.S. national phase of International Application PCT/EP2004/014609, filed Dec. 22, 2004, claiming priority to German Patent Application 10361505.9 filed Dec. 23, 2003, and the benefit under 35 U.S.C. 119(e) of U.S. Provisional Application No. 60/548,019, filed Feb. 25, 2004; the disclosures of International Application PCT/EP2004/014609, German Patent Application 10361505.9 and U.S. Provisional Application No. 60/548,019, each as filed, are incorporated herein by reference.

The present invention relates to a catalyst system for the polymerization of olefins, which comprises an organic transition compound and, as cocatalyst, an ionic compound made up of anions comprising aluminum and trifluoromethyl groups and Lewis-acid cations or Brönsted acids as cations. Furthermore, the present invention relates to a process for preparing such catalyst systems and to a process for the polymerization of olefins using these catalyst systems.

Organic transition metal compounds such as metallocene complexes are of great interest as catalysts for olefin polymerization because they make it possible to synthesize polyolefins which cannot be obtained using conventional Ziegler-Natta catalysts. For example, such single-site catalysts lead to polymers having a narrow molar mass distribution and uniform incorporation of comonomers.

For organic transition metal compounds such as metallocene complexes to be effective as catalysts for olefin polymerization, it is necessary to react them with further compounds which serve as cocatalyst. A frequently used class of cocatalysts comprises aluminoxanes such as methyllaluminoxane (MAO). However, these have the disadvantage that they have to be used in a large excess. Further compounds which can be used as cocatalysts are compounds which convert the organic transition metal compounds into cationic complexes.

EP-A 427 697 discloses, for example, catalyst systems comprising an uncharged metallocene compound, an aluminum alkyl and a Lewis acid such as trispentafluorophenylborane. In EP 520 732 too, homogeneous catalysts for olefin polymerization are obtained by reacting a transition metal compound containing n-bonded ligands with a Lewis acid such as trispentafluorophenylborane.

EP-A 558 158 describes zwitterionic catalyst systems which are obtainable from dialkyl-metallocene compounds and salts of the formula $[R_3NH]^+[BPh_4]^-$. U.S. Pat. No. 5,384,299 discloses ionic polymerization catalysts which are stabilized by noncoordinating anions, and these, too, are obtainable from dialkyl-metallocene compounds and salts of the formula $[R_3NH]^+[BPh_4]^-$.

I. Krossing, Chem. Eur. J. 2001, 7, pages 490-502, describes the preparation and characterization of specific silver polyfluoroalkoxyaluminates in which weakly coordinating anions are present.

Disadvantages of the above-described processes for preparing catalyst systems for olefin polymerization are that the starting materials used are generally very expensive and the polymerization activities of the catalyst systems are still capable of improvement.

It is an object of the present invention to discover a catalyst system for the polymerization of olefins, which can be prepared using relatively inexpensive starting materials and which have a high polymerization activity or in which only a relatively small amount of expensive starting materials is necessary or cheaper starting materials can be used in order to achieve a good polymerization activity.

We have found that this object is achieved by catalyst systems for olefin polymerization comprising an organic transition metal compound and, as cocatalyst, an ionic compound made up of anions of the formula (Ia), $$[Al(OR^1)_4]^- \qquad (Ia)$$

where the radicals
$R^1$ are identical or different and are each, independently of one another, a radical $R^2R^3(CF_3)_2$,
$R^2$ is a carbon or silicon atom and
$R^3$ is hydrogen, $C_1$-$C_{20}$-alkyl, $C_1$-$C_{20}$-fluoroalkyl, $C_6$-$C_{20}$-aryl, $C_6$-$C_{20}$-fluoroaryl, $C_7$-$C_{40}$-arylalkyl, $C_7$-$C_{40}$-fluoroarylalkyl, $C_7$-$C_{40}$-alkylaryl, $C_7$-$C_{40}$-fluoroalkylaryl or an $SiR^4_3$ group, where
$R^4$ may be identical or different and is each $C_1$-$C_{20}$-alkyl, $C_1$-$C_{20}$-fluoroalkyl, $C_6$-$C_{20}$-aryl, $C_6$-$C_{20}$-fluoroaryl, $C_7$-$C_{40}$-arylalkyl, $C_7$-$C_{40}$-fluoroarylalkyl, $C_7$-$C_{40}$-alkylaryl or $C_7$-$C_{40}$-fluoroalkylaryl, and Lewis-acid cations or Brönsted acids as cations.

Furthermore, we have found a process of preparing such catalyst systems and a process for the polymerization of olefins using these catalyst systems.

The catalyst systems of the present invention are suitable for the polymerization of olefins and especially for the polymerization of α-olefins, i.e. hydrocarbons having terminal double bonds. Suitable monomers include functionalized olefinically unsaturated compounds such as ester or amide derivatives of acrylic or methacrylic acid, for example acrylates, methacrylates or acrylonitrile. Preference is given to nonpolar olefinic compounds, including aryl-substituted α-olefins. Particularly preferred α-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various α-olefins.

Suitable olefins also include ones in which the double bond is part of a cyclic structure comprising one or more ring systems. Examples are cyclopentene, norbornene, tetracyclododecene and methylnorbornene and dienes such as 5-ethylidene-2-norbornene, norbornadiene or ethylnorbornadiene.

It is also possible to polymerize mixtures of two or more olefins.

In particular, the supported cocatalyst of the present invention can be used for the polymerization or copolymerization of ethylene or propylene. As comonomers in ethylene polymerization, preference is given to using $C_3$-$C_8$-α-olefins, in particular 1-butene, 1-pentene, 1-hexene and/or 1-octene. Preferred comonomers in propylene polymerization are ethylene and/or 1-butene.

As cocatalyst, the catalyst systems of the present invention comprise an ionic compound comprising anions of the formula (Ia), $$[Al(OR^1)_4]^- \qquad (Ia)$$

where
the radicals $R^1$ are identical or different, preferably identical, and are each, independently of one another, a radical $R^2R^3(CF_3)_2$,
$R^2$ is a carbon or silicon atom, preferably a carbon atom, and
$R^3$ is hydrogen, $C_1$-$C_{20}$-alkyl, preferably $C_1$-$C_4$-alkyl and in particular methyl, $C_1$-$C_{20}$-fluoroalkyl, preferably $C_1$-$C_4$- fluoroalkyl and in particular trifluoromethyl, $C_6$-$C_{20}$-aryl, preferably phenyl, $C_6$-$C_{20}$-fluoroaryl, preferably pentafluorophenyl, $C_7$-$C_{40}$-arylalkyl, $C_7$-$C_{40}$-fluoroarylalkyl, $C_7$-$C_{40}$-alkylaryl, $C_7$-$C_{40}$-fluoroalkylaryl or an $SiR^4_3$ group, where $R^4$ may be identical or different and is each $C_1$-$C_{20}$-alkyl, $C_1$-$C_{20}$-fluoroalkyl, preferably $C_1$-$C_4$-fluoroalkyl and in particular trifluoromethyl, $C_6$-$C_{20}$-aryl, $C_6$-$C_{20}$-fluoroaryl, $C_7$-$C_{40}$-arylalkyl, $C_7$-$C_{40}$-fluoroarylalkyl, $C_7$-$C_{40}$-alkylaryl or $C_7$-$C_{40}$-fluoroalkylaryl.

Examples of suitable radicals $R^1$ are $C(CF_3)_3$, $CCH_3(CF_3)_2$, $CH(CF_3)_2$, $CPh(CF_3)_2$, $C(C_6F_5)(CF_3)_2$, $C\{Si(CF_3)_3\}_3$, $Si(CF_3)_3$, $SiCH_3(CF_3)_2$, $SiPh(CF_3)_2$, with preference being given to $C(CF_3)_3$, $CCH_3(CF_3)_2$, $CH(CF_3)_2$ and $CPh(CF_3)_2$, in particular $C(CF_3)_3$.

Particularly preferred examples of anions of the formula (Ia) are $Al[OC(CF_3)_3]_4^-$, $Al[OCCH_3(CF_3)_2]_4^-$, $Al[OCH(CF_3)_2]_4$ and $Al[OCPh(CF_3)_2]_4$, in particular $Al[OC(CF_3)_3]_4$.

The counterions of the anions of the formula (Ia) can be Lewis-acid cations or Brönsted acids in the form of cations.

Suitable Lewis-acid cations include cations of the formula (Ib),

$$[((M^1)^{a+})Q_1 Q_2 \ldots Q_z]^{d+} \quad (Ib)$$

where $M^1$ is an element of groups 1 to 16 of the Periodic Table of the Elements, $Q_1$ to $Q_z$, are singly negatively charged groups such as $C_1$-$C_{28}$-alkyl, $C_6$-$C_{15}$-aryl, alkylaryl, arylalkyl, haloalkyl, haloaryl each having from 6 to 20 carbon atoms in the aryl radical and from 1 to 28 carbon atoms in the alkyl radical, $C_3$-$C_{10}$-cycloalkyl which may bear $C_1$-$C_{10}$-alkyl groups as substituents, halogen, $C_1$-$C_{28}$-alkoxy, $C_6$-$C_{15}$-aryloxy, silyl or mercaptyl groups, a is an integer from 1 to 6 and z is an integer from 0 to 5, and d corresponds to the difference a-z, but d is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation.

Suitable Brönsted acids in the form of cations have the formula (Ic), $$[AR^5_2H]^+ \quad (Ic)$$

where

A is an element of group 15 of the Periodic Table of the Elements, in particular nitrogen, and $R^5$ may be identical or different and is each, independently of one another, $C_1$-$C_{20}$-alkyl, $C_1$-$C_{20}$-haloalkyl, $C_1$-$C_{10}$-alkoxyl $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl.

As Brönsted acids, particular preference is given to protinated amine or aniline derivatives. Preferred cations are N,N-dimethylanilinium, N,N-dimethylcyclohexylammonium and N,N-dimethylbenzylammonium and also derivatives of the latter two.

As counterions of the anions of the formula (Ia), preference is given to using Brönsted acids in the form of cations, giving a cocatalyst of the formula (II), $$[Al(OR^1)_4]^-[AR^5_2H]^+ \quad (II)$$

where A, $R^1$ and $R^5$ are as defined above.

The preparation of cocatalysts comprising the anions of the formula (Ia) can, for example, be carried out by the method described in 1. Krossing, Chem. Eur. J. 2001, 7, pages 490-502. Here, $LiAlH_4$ is reacted with the appropriate alcohol or alcohols $HOR^1$ to give the lithium salt of the anions of the formula (Ia). This lithium salt can be used as such as cocatalyst in the catalyst systems of the present invention, but preference is given to replacing the lithium cation by other cations, in particular cations of the formula (Ib) or (Ic). Replacement by the silver cation is likewise described in I. Krossing, Chem. Eur. J. 2001, 7, pages 490-502. Possible ways of introducing other cations as counterions of the anions of the formula (Ia) are also known to those skilled in the art.

The catalyst systems of the present invention for olefin polymerization further comprise at least one organic transition metal compound. As organic transition metal compound, it is in principle possible to use all compounds of the transition metals of groups 3 to 12 of the Periodic Table or the lanthanides which contain organic groups and after reaction with the cocatalyst and, if appropriate, organometallic compounds form active catalysts for olefin polymerization. These are usually compounds in which at least one monodentate or polydentate ligand is bound to the central atom via a sigma or pi bond. Possible ligands include both ligands containing cyclopentadienyl groups and ligands which are free of cyclopentadienyl groups. A large number of such organic transition metal compounds which are suitable for olefin polymerization are described in Chem. Rev. 2000, Vol. 100, No. 4. Furthermore, multinuclear cyclopentadienyl complexes are also suitable for olefin polymerization.

Suitable organic transition metal compounds include, in particular, compounds having at least one cyclopentadienyl-type ligand; those having two cyclopentadienyl-type ligands are generally referred to as metallocene complexes. Among organic transition metal compounds having at least one cyclopentadienyl-type ligand, particularly useful compounds are those of the formula (III)

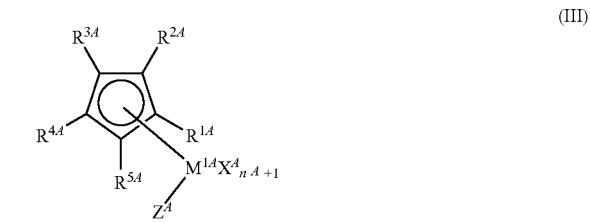

(III)

where the substituents and indices having the following meanings:

$M^{1A}$ is titanium, zirconium, hafnium, vanadium, niobium, tantalum, chromium, molybdenum or tungsten, or an element of group 3 of the Periodic Table and the lanthanides, $X^{1A}$ the radicals $X^{1A}$ are identical or different and are each, independently of one another, fluorine, chlorine, bromine, iodine, hydrogen, $C_1$-$C_{10}$-alkyl, $C_2$-$C_{10}$-alkenyl, $C_6$-$C_{15}$-aryl $C_7$-$C_{40}$-alkylaryl, $C_7$-$C_{40}$-arylalkyl, —$OR^{6A}$ or —$NR^{6A}R^{7A}$ or two radicals $X^A$ are joined to one another and form, for example, a substituted or unsubstituted diene ligand, in particular a 1,3-diene ligand, or a biaryloxy group, where $R^{6A}$ and $R^{7A}$ are each $C_1$-$C_{10}$-alkyl, $C_6$-$C_{15}$-aryl, $C_7$-$C_{40}$-arylalkyl, $C_7$-$C_{40}$-alkylaryl, fluoroalkyl or fluoroaryl each having from 1 to 16 carbon atoms in the alkyl radical and from 6 to 21 carbon atoms in the aryl radical, $n^A$ is 1, 2 or 3 and is such that, depending on the valence of M, the metallocene complex of the formula (III) is uncharged, $R^{1A}$ to $R^{5A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, $C_7$-$C_{40}$-arylalkyl, $C_7$-$C_{40}$-alkylaryl, —$NR^{8A}_2$, —$N(SiR^{8A}_3)_2$, —$OR^{8A}$, —$OSiR^{8A}_3$, —$SiR^{8A}_3$, where the radicals $R^{1A}$ to $R^{5A}$ may also be substituted by halogen and/or two radicals $R^{1A}$ to $R^{5A}$, in particular adjacent radicals, together with the atoms connecting them may be joined to form a preferably five-, six- or seven-membered ring or a preferably five-, six- or seven-membered heterocycle containing at least one atom from the group consisting of N, P, O and S, where $R^{8A}$ may be identical or different and is each $C_1$-$C_{10}$-alkyl, $C_3$-$C_{10}$-cycloalkyl, $C_6$-$C_{15}$-aryl, $C_1$-$C_4$-alkoxyl or $C_6$-$C_{10}$-aryloxy and $Z^A$ is as defined for $X^A$ or is

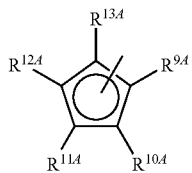

where the radicals $R^{9A}$ to $R^{13A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, $C_7$-$C_{40}$-arylalkyl, $C_7$-$C_{40}$-alkylaryl, —$NR^{14A}_2$, —$N(SiR^{14A}_3)_2$, —$OR^{14A}$, $OSiR^{14A}_3$, —$SiR^{14A}_3$, where the radicals $R^{1A}$ to $R^{5A}$ may also be substituted by halogen and/or two radicals $R^{1A}$ to $R^{5A}$, in particular adjacent radicals, together with the atoms connecting them may be joined to form a preferably five-, six- or seven-membered ring or a preferably five-, six- or seven-membered heterocycle containing at least one atom from the group consisting of N, P, O or S, where $R^{14A}$ may be identical or different and is each $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy, or the radicals $R^{4A}$ and $Z^A$ together form a —$R^{15A}_{\nu}$A-$A^A$- group in which $R^{15A}$ is

where $R^{16A}$, $R^{17A}$ and $R^{18A}$ are identical or different and are each a hydrogen atom, a halogen atom, a trimethylsilyl group, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and $M^{2A}$ is silicon, germanium or tin, preferably silicon, $A^A$ is —O—, —S—, —$NR^{19A}$—, —$PR^{19A}$—, —O—$R^{19A}$, —$NR^{19A}_2$, —$PR^{19A}_2$ or an unsubstituted, substituted or fused, heterocyclic ring system, where $R^{19A}$ are each, independently of one another, $C_1$-$C_{10}$-alkyl, $C_6$-$C_{15}$-aryl, $C_3$-$C_{11}$-cycloalkyl, $C_7$-$C_{18}$-alkylaryl or —Si($R^{20A}$)$_3$, $R^{20A}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl, $v^A$ is 1 or when $A^A$ is an unsubstituted, substituted or fused, heterocyclic ring system can be 1 or 0 or the radicals $R^{4A}$ and $R^{12A}$ together form an —$R^{15A}$-group.

The radicals $X^A$ in the formula (III) are preferably identical and are preferably fluorine, chlorine, bromine, $C_1$-$C_7$-alkyl or arylalkyl, in particular chlorine, methyl or benzyl.

Among the organic transition metal compounds of the formula (III), preference is given to

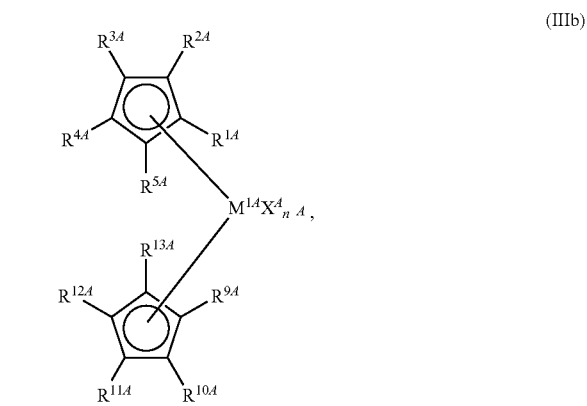

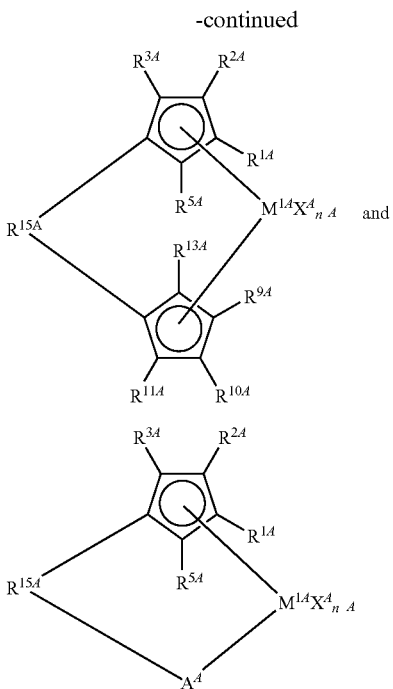

Among the compounds of the formula (IIIa), particular preference is given to those in which
$M^{1A}$ is titanium or chromium,
$X^A$ is chlorine, $C_1$-$C_4$-alkyl, phenyl, alkoxy or aryloxy,
$n^A$ is 1 or 2 and
$R^{1A}$ to $R^{5A}$ are each hydrogen or $C_1$-$C_4$-alkyl or two adjacent radicals $R^{1A}$ to $R^{5A}$ together with the atoms connecting them form a substituted or unsubstituted unsaturated six-membered ring.

Among the metallocenes of the formula (IIIb), preference is given to those in which
$M^{1A}$ is titanium, zirconium, hafnium or chromium,
$X^A$ is chlorine, $C_1$-$C_4$-alkyl or benzyl or two radicals $X^A$ form a substituted or un-substituted butadiene ligand,
$n^A$ is 1 or 2, preferably 2, or when $M^{1A}$ is chromium is 0,
$R^{1A}$ to $R^{5A}$ are each hydrogen, $C_1$-$C_8$-alkyl, $C_6$-$C_{10}$-aryl, $-NR^{8A}_2$, $-OSiR^{8A}_3$, $-SiR^{8A}_3$ or $-Si(R^{8A})_3$ and
$R^{9A}$ to $R^{13A}$ are each hydrogen, $C_1$-$C_8$-alkyl, $C_6$-$C_{10}$-aryl, $-NR^{8A}_2$, $-OSiR^{8A}_3$, $-SiR^{8A}_3$ or $-Si(R^{8A})_3$
or two radicals $R^{1A}$ to $R^{5A}$ and/or $R^{9A}$ to $R^{13A}$ together with the cyclopentadienyl ring form an indenyl or substituted indenyl system.

The compounds of the formula (IIIb) in which the cyclopentadienyl radicals are identical are particularly useful.

Examples of particularly useful compounds of the formula (IIIb) are
bis(cyclopentadienyl) zirconium dichloride,
bis(pentamethylcyclopentadienyl) zirconium dichloride,
bis(methylcyclopentadienyl) zirconium dichloride,
bis(ethylcyclopentadienyl) zirconium dichloride,
bis(n-butylcyclopentadienyl) zirconium dichloride,
bis(1-n-butyl-3-methylcyclopentadienyl) zirconium dichloride,
bis(indenyl) zirconium dichloride,
bis(tetrahydroindenyl) zirconium dichloride and
bis(trimethylsilylcyclopentadienyl) zirconium dichloride,
and also the corresponding dimethylzirconium compounds.

Particularly useful metallocenes of the formula (IIIc) are those in which
$R^{1A}$ and $R^{9A}$ are identical or different and are each hydrogen or a $C_1$-$C_{10}$-alkyl group,
$R^{5A}$ and $R^{13A}$ are identical or different and are each hydrogen or a methyl, ethyl, isopropyl or tert-butyl group,
$R^{3A}$ and $R^{11A}$ are each $C_1$-$C_4$-alkyl and
$R^{2A}$ and $R^{10A}$ are each hydrogen or the two adjacent radicals $R^{2A}$ and $R^{3A}$ or $R^{10A}$ and $R^{11A}$ together form a saturated or unsaturated cyclic group having from 4 to 44 carbon atoms,
$R^{15A}$ is $-M^{2A}R^{16A}R^{17A}-$ or $-CR^{16A}R^{17A}-CR^{16A}R^{17A}-$ or $-BR^{16A}-$ or $-BNR^{16A}R^{17A}-$,
$M^{1A}$ is titanium, zirconium or hafnium and
$X^A$ are identical or different and are each chlorine, $C_1$-$C_4$-alkyl, benzyl, phenyl or $C_7$-$C_{15}$-alkylaryloxy.

Especially useful compounds of the formula (IIIc) are those of the formula (IIIc')

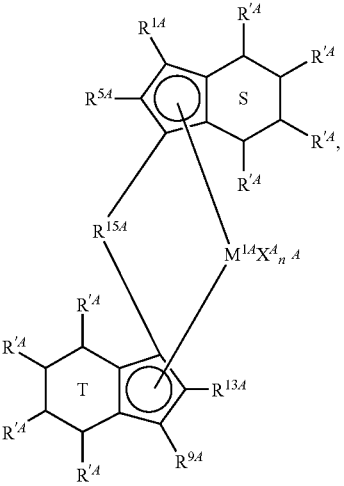

where
$R^A$ may be identical or different and is each hydrogen, $C_1$-$C_{10}$-alkyl or $C_3$-$C_{10}$-cycloalkyl, preferably methyl, ethyl, isopropyl or cyclohexyl, $C_6$-$C_{20}$-aryl, preferably phenyl, naphthyl or mesityl, $C_7$-$C_{40}$-arylalkyl, $C_7$-$C_{40}$-alkylaryl, preferably 4-tert-butylphenyl or 3,5-di-tert-butylphenyl, or $C_8$-$C_{40}$-arylalkenyl, $R^{5A}$ and $R^{13A}$ are identical or different and are each hydrogen, $C_1$-$C_6$-alkyl, preferably methyl, ethyl, isopropyl, n-propyl, n-butyl, n-hexyl or tert-butyl, and the rings S and T may be identical or different and are saturated, unsaturated or partially saturated.

The indenyl or tetrahydroindenyl ligands of the metallocenes of the formula (IIIc') are preferably substituted in the 2 position, the 2,4 positions, the 4,7 positions, the 2,4,7 positions, the 2,6 positions, the 2,4,6 positions, the 2,5,6 positions, the 2,4,5,6 positions or the 2,4,5,6,7 positions, in particular in the 2,4 positions, with the following numbering applying to the site of substitution:

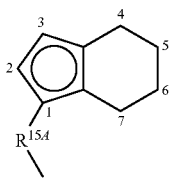

As complexes (IIIc'), preference is given to using bridged bis-indenyl complexes in the rac or pseudo-rac form. The term "pseudo-rac form" refers to complexes in which the two indenyl ligands are in the rac arrangement relative to one another when all other substituents of the complex are disregarded.

Examples of particularly useful metallocenes (IIIc) and (IIIc') include
dimethylsilanediylbis(cyclopentadienyl) zirconium dichloride,
dimethylsilanediylbis(indenyl) zirconium dichloride,
dimethylsilanediylbis(tetrahydroindenyl) zirconium dichloride,
ethylenebis(cyclopentadienyl) zirconium dichloride,
ethylenebis(indenyl) zirconium dichloride,
ethylenebis(tetrahydroindenyl) zirconium dichloride,
tetramethylethylene-9-fluorenylcyclopentadienyl) zirconium dichloride,
dimethylsilanediylbis(3-tert-butyl-5-methylcyclopentadienyl) zirconium dichloride,
dimethylsilanediylbis(3-tert-butyl-5-ethylcyclopentadienyl) zirconium dichloride,
dimethylsilanediylbis(2-methylindenyl) zirconium dichloride,
dimethylsilanediylbis(2-isopropylindenyl) zirconium dichloride,
dimethylsilanediylbis(2-tert-butylindenyl) zirconium dichloride,
diethylsilanediylbis(2-methylindenyl) zirconium dibromide,
dimethylsilanediylbis(3-methyl-5-methylcyclopentadienyl) zirconium dichloride,
dimethylsilanediylbis(3-ethyl-5-isopropylcyclopentadienyl) zirconium dichloride,
dimethylsilanediylbis(2-ethylindenyl) zirconium dichloride,
dimethylsilanediylbis(2-methyl-4,5-benzindenyl) zirconium dichloride,
dimethylsilanediylbis(2-ethyl-4,5-benzindenyl) zirconium dichloride,
methylphenylsilanediylbis(2-methyl-4,5-benzindenyl) zirconium dichloride,
methylphenylsilanediylbis(2-ethyl-4,5-benzindenyl) zirconium dichloride,
diphenylsilanediylbis(2-methyl-4,5-benzindenyl) zirconium dichloride,
diphenylsilanediylbis(2-ethyl-4,5-benzindenyl) zirconium dichloride,
diphenylsilanediylbis(2-methylindenyl) hafnium dichloride,
dimethylsilanediylbis(2-methyl-4-phenylindenyl) zirconium dichloride,
dimethylsilanediylbis(2-ethyl-4-phenylindenyl) zirconium dichloride,
dimethylsilanediylbis(2-methyl-4-(1-naphthyl)indenyl) zirconium dichloride,
dimethylsilanediylbis(2-ethyl-4-(1-naphthyl)indenyl) zirconium dichloride,
dimethylsilanediylbis(2-propyl-4-(1-naphthyl)indenyl) zirconium dichloride,
dimethylsilanediylbis(2-1-butyl-4-(1-naphthyl)indenyl) zirconium dichloride,
dimethylsilanediylbis(2-propyl-4-(9-phenanthryl)indenyl) zirconium dichloride,
dimethylsilanediylbis(2-methyl-4-isopropylindenyl) zirconium dichloride,
dimethylsilanediylbis(2,7-dimethyl-4-isopropylindenyl) zirconium dichloride,
dimethylsilanediylbis(2-methyl-4,6-diisopropylindenyl) zirconium dichloride,
dimethylsilanediylbis(2-methyl-4-[p-trifluoromethylphenyl]indenyl) zirconium dichloride,
dimethylsilanediylbis(2-methyl-4-[3',5'-dimethylphenyl]indenyl) zirconium dichloride,
dimethylsilanediylbis(2-methyl-4-[4'-tert-butylphenyl]indenyl) zirconium dichloride, diethylsilanediylbis(2-methyl-4-[4'-tert-butylphenyl]indenyl) zirconium dichloride,
dimethylsilanediylbis(2-ethyl-4-[4'-tert-butylphenyl]indenyl) zirconium dichloride,
dimethylsilanediylbis(2-propyl-4-[4'-tert-butylphenyl]indenyl) zirconium dichloride,
dimethylsilanediylbis(2-isopropyl-4-[4'-tert-butylphenyl]indenyl) zirconium dichloride,
dimethylsilanediylbis(2-n-butyl-4-[4'-tert-butylphenyl]indenyl) zirconium dichloride,
dimethylsilanediylbis(2-hexyl-4-[4'-tert-butylphenyl]indenyl) zirconium dichloride,
dimethylsilanediyl(2-isopropyl-4-phenylindenyl)(2-methyl-4-phenylindenyl) zirconium dichloride,
dimethylsilanediyl(2-isopropyl-4-(1-naphthyl)indenyl)(2-methyl-4-(1-naphthyl)indenyl) zirconium dichloride,
dimethylsilanediyl(2-isopropyl-4-[4'-butylphenyl]indenyl)(2-methyl-4-[4'-tert-butylphenyl]indenyl) zirconium dichloride,
dimethylsilanediyl(2-isopropyl-4-[4'-tert-butylphenyl]indenyl)(2-ethyl-4-[4'-tert-butylphenyl]indenyl) zirconium dichloride,
dimethylsilanediyl(2-isopropyl-4-[4'-tert-butylphenyl]indenyl)(2-methyl-4-[3',5'-bis-tert-butylphenyl]indenyl) zirconium dichloride,
dimethylsilanediyl(2-isopropyl-4-[4'-tert-butylphenyl]indenyl)(2-methyl-4-[1'-naphthyl]indenyl) zirconium dichloride and
ethylene(2-isopropyl-4-[4'-tert-butylphenyl]indenyl)(2-methyl-4-[4'-tert-butylphenyl]indenyl) zirconium dichloride and also the corresponding dimethylzirconium, monochloromono(alkylaryloxy) zirconium and di(alkylaryloxy) zirconium compounds.

Particularly useful compounds of the formula (IIId) are those in which
$M^{1A}$ is titanium or zirconium, in particular titanium, and
$X^A$ is chlorine, $C_1$-$C_4$-alkyl or phenyl or two radicals $X^A$ are joined to form a substituted or unsubstituted butadiene ligand,
$R^{15A}$ is —$SiR^{16A}R^{17A}$— or —$CR^{16A}R^{17A}$—$CR^{16A}R^{17}$— and
$A^A$ is —O—, —S— or —$NR^{19A}$—,
$R^{1A}$ to $R^{3A}$ and $R^{5A}$ are each hydrogen, $C_1$-$C_{10}$-alkyl, preferably methyl, $C_3$-$C_{10}$-cycloalkyl, $C_6$-$C_{15}$-aryl or —Si$(R^{8A})_3$, or two adjacent radicals form a cyclic group having from 4 to 12 carbon atoms, with particular preference being given to all $R^{1A}$ to $R^{3A}$ and $R^{5A}$ being methyl.

Another group of compounds of the formula (IIId) which are particularly useful are those in which
$M^{1A}$ is titanium or chromium, preferably in the oxidation state III, and $X^A$ is chlorine, $C_1$-$C_4$-alkyl or phenyl or two radicals $X^A$ form a substituted or unsubstituted butadiene ligand, $R^{15A}$ is —$SiR^{16A}R^{17A}$— or —$CR^{16A}R^{17A}$—$CR^{16A}R^{17A}$— and $A^A$ is —O—$R^{19A}$, —$NR^{19A}_2$—, —$PR^{19A}_2$, $R^{1A}$ to $R^{3A}$ and $R^{5A}$ are each hydrogen, $C_1$-$C_{10}$-alkyl, $C_3$-$C_{10}$-cycloalkyl, $C_6$-$C_{15}$-aryl or —$Si(R^{8A})_3$, or two adjacent radicals form a cyclic group having from 4 to 12 carbon atoms.

Such complexes can be synthesized by methods known per se, preferably by reacting the appropriately substituted, cyclic hydrocarbon anions with halides of titanium, zirconium, hafnium, vanadium, niobium, tantalum or chromium.

Examples of appropriate preparative methods are described, inter alia, in Journal of Organometallic Chemistry, 369 (1989), 359-370.

Further suitable organic transition metal compounds include metallocenes having at least one ligand formed by a cyclopentadienyl or heterocyclopentadienyl group having a fused-on heterocycle in which at least one carbon atom is replaced by a heteroatom, preferably a heteroatom from group 15 or 16 of the Periodic Table and in particular nitrogen or sulfur. Such compounds are described, for example, in WO 98/22486. They are, in particular:

dimethylsilanediyl(2-methyl-4-phenylindenyl)(2,5-dimethyl-N-phenyl-4-azapentalene) zirconium dichloride, dimethylsilanediylbis(2-methyl-4-phenyl-4-hydroazulenyl) zirconium dichloride and dimethylsilanediylbis(2-ethyl-4-phenyl-4-hydroazulenyl) zirconium dichloride.

Further organic transition metal compounds suitable for the purposes of the present invention are transition metal complexes with at least one ligand of the formulae (IVa) to (IVe),

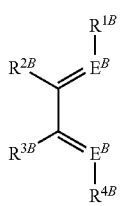
(IVa)

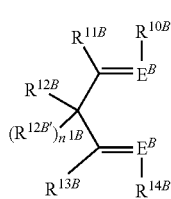
(IVb)

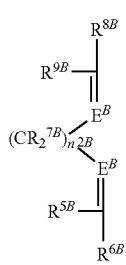
(IVc)

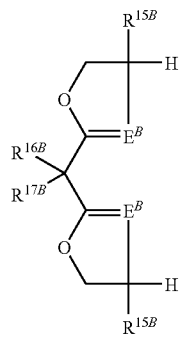
(IVd)

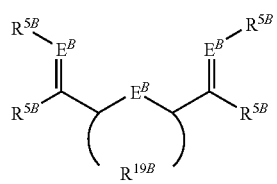
(IVe)

where the transition metal is selected from among the elements Ti, Zr, Hf, Sc, V, Nb, Ta, Cr, Mo, W, Fe, Co, Ni, Pd, Pt and the elements of the rare earth metals. Preference is given to compounds having nickel, iron, cobalt or palladium as central metal.

$E^B$ is an element of group 15 of the Periodic Table of the Elements, preferably N or P, with particular preference being given to N. The two or three atoms $E^B$ in a molecule can be identical or different.

The radicals $R^{1B}$ to $R^{19B}$, which may be identical or different within a ligand system of the formula (IVa) to (IVe), are as follows:

$R^{1B}$ and $R^{4B}$ are each, independently of one another, a hydrocarbon radical or a substituted hydrocarbon radical, preferably a hydrocarbon radical in which the carbon atom adjacent to the element $E^B$ is bound to at least two carbon atoms, $R^{2B}$ and $R^{3B}$ are each, independently of one another, hydrogen, a hydrocarbon radical or a substituted hydrocarbon radical, where $R^{2B}$ and $R^{3B}$ may together also form a ring system in which one or more heteroatoms may be present, $R^{6B}$ and $R^{8B}$ are each, independently of one another, a hydrocarbon radical or a substituted hydrocarbon radical, $R^{5B}$ and $R^{9B}$ are each, independently of one another, hydrogen, a hydrocarbon radical or a substituted hydrocarbon radical, where $R^{6B}$ and $R^{5B}$ or $R^{6B}$ and $R^{9B}$ may together also form a ring system, $R^{7B}$ are each, independently of one another, hydrogen, a hydrocarbon radical or a substituted hydrocarbon radical, where two radicals $R^{7A}$ may together also form a ring system, $R^{10B}$ and $R^{14B}$ are each, independently of one another, a hydrocarbon radical or a substituted hydrocarbon radical, $R^{11B}$, $R^{12B}$, $R^{12B'}$ and $R^{13B}$ are each, independently of one another, hydrogen, a hydrocarbon radical or a substituted hydrocarbon radical, where two or more geminal or vicinal radicals $R^{11B}$, $R^{12B}$, $R^{12B'}$ and $R^{13B}$ may together also form a ring system, $R^{15B}$ and $R^{18B}$ are each, independently of one another, hydrogen, a hydrocarbon radical or a substituted hydrocarbon radical, $R^{16B}$ and $R^{17B}$ are each, independently of one another, hydrogen, a hydrocarbon radical or a substituted hydrocarbon radical, $R^{19B}$ is an organic radical which forms a 5- to 7-membered substituted or unsubstituted, in particular unsaturated or aromatic, heterocyclic ring system, in particular together with $E^B$ forms a pyridine system, $n^{1B}$ is 0 or 1, with the compounds of the formula (IVc) being negatively charged when $n^{1B}$ is 0, and $n^{2B}$ is an integer from 1 to 4, preferably 2 or 3.

Particularly useful transition metal complexes with ligands of the formulae (IVa) to (IVd) are, for example, complexes of the transition metals Fe, Co, Ni, Pd or Pt with ligands of the formula (IVa). Particular preference is given to diimine complexes of Ni or Pd, e.g.:

di(2,6-di-1-propylphenyl)-2,3-dimethyldiazabutadienepalladium dichloride,
di(di-1-propylphenyl)-2,3-dimethyldiazabutadienenickel dichloride,
di(2,6-di-1-propylphenyl)-2,3-dimethyldiazabutadienedimethylpalladium,
di(2,6-di-1-propylphenyl)-2,3-dimethyldiazabutadienedimethylnickel,
di(2,6-dimethylphenyl)-2,3-dimethyldiazabutadienepalladium dichloride,
di(2,6-dimethylphenyl)-2,3-dimethyldiazabutadienenickel dichloride,
di(2,6-dimethylphenyl)-2,3-dimethyldiazabutadienedimethylpalladium,
di(2,6-dimethylphenyl)-2,3-dimethyldiazabutadienedimethylnickel,
di(2-methylphenyl)-2,3-dimethyldiazabutadienepalladium dichloride,
di(2-methylphenyl)-2,3-dimethyldiazabutadienenickel dichloride,
di(2-methylphenyl)-2,3-dimethyldiazabutadienedimethylpalladium,
di(2-methylphenyl)-2,3-dimethyldiazabutadienedimethylnickel,
diphenyl-2,3-dimethyldiazabutadienepalladium dichloride,
diphenyl-2,3-dimethyldiazabutadienenickel dichloride,
diphenyl-2,3-dimethyldiazabutadienedimethylpalladium,
diphenyl-2,3-dimethyldiazabutadienedimethylnickel,
di(2,6-dimethylphenyl)azanaphthenepalladium dichloride,
di(2,6-dimethylphenyl)azanaphthenenickel dichloride,
di(2,6-dimethylphenyl)azanaphthenedimethylpalladium,
di(2,6-dimethylphenyl)azanaphthenedimethylnickel,
1,1'-bipyridylpalladium dichloride,
1,1'-bipyridylnickel dichloride,
1,1'-bipyridyl(dimethyl)palladium or
1,1'-bipyridyl(dimethyl)nickel.

Particularly useful compounds (IVe) also include those which are described in J. Am. Chem. Soc. 120, p. 4049 ff. (1998), J. Chem. Soc., Chem. Commun. 1998, 849. As complexes having ligands (IVe), preference is given to using 2,6-bis(imino)pyridyl complexes of the transition metals Fe, Co, Ni, Pd or Pt, in particular Fe.

Iminophenoxide complexes can also be used as organic transition metal compounds. The ligands can be prepared, for example, from substituted or unsubstituted salicylaldehydes and primary amines, in particular substituted or unsubstituted arylamines. Transition metal complexes with pi ligands having one or more heteroatoms in the pi system, for example the boratabenzene ligand, the pyrrolyl anion or the phospholyl anion, can also be used as organic transition metal compounds D).

Further transition metal compounds which are suitable for the purposes of the present invention are substituted monocyclopentadienyl, monoindenyl, monofluorenyl or heterocyclopentadienyl complexes of chromium, molybdenum or tungsten in which at least one of the substituents on the cyclopentadienyl ring bears a rigid donor function which is not bound exclusively via $sp^3$-hybridized carbon or silicon atoms. In such complexes, the most direct link to the donor function contains at least one sp- or $sp^2$-hybridized carbon atom, preferably from one to three $sp^2$-hybridized carbon atoms. The direct link preferably contains an unsaturated double bond, an aromatic or together with the donor forms a partially unsaturated or aromatic heterocyclic system.

In the transition metal compounds, the cyclopentadienyl ring can also be a heterocyclopentadienyl ligand, i.e. at least one carbon atom can be replaced by a heteroatom from group 15 or 16. In this case, a $C_5$ ring carbon is preferably replaced by phosphorus. In particular, the cyclopentadienyl ring is substituted by further alkyl groups which may also form a five- or six-membered ring, e.g. tetrahydroindenyl, indenyl, benzindenyl or fluorenyl.

Possible donors are uncharged functional groups containing an element of group 15 or 16 of the Periodic Table, e.g. amine, imine, carboxamide, carboxylic ester, ketone (oxo), ether, thioketone, phosphine, phosphite, phosphine oxide, sulfonyl, sulfonamide or unsubstituted, substituted or fused, partially unsaturated heterocyclic or heteroaromatic ring systems.

Preference is in this case given to substituted monocyclopentadienyl, monoindenyl, monofluorenyl or heterocyclopentadienyl complexes of the formula (V)

where $M^C$ is chromium, molybdenum or tungsten and
$Z^C$ has the formula (Va)

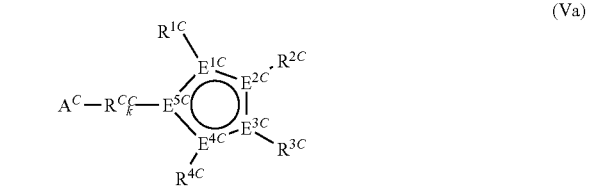

where the variables have the following meanings:
$E^{1C}$-$E^{5C}$ are each carbon or not more than one atom $E^{1C\ to\ E5C}$ is phosphorus or nitrogen,
$A_C$ is $-NR^{5C}R^{6C}$, $-PR^{5C}R^{6C}$, $-OR^{5C}$, $-SR^{5C}$ or an unsubstituted, substituted or fused, partially unsaturated heterocyclic or heteroaromatic ring system,
$R^C$ is one of the following groups:

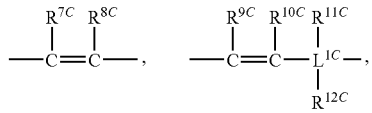

and, if $A^C$ is an unsubstituted, substituted or fused, partially unsaturated heterocyclic or heteroaromatic ring system, may also be

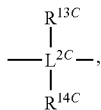

where $L^{1C}$, $L^{2C}$ are each silicon or carbon, $k^C$ is 1 or when $A^{1C}$ is an unsubstituted, substituted or fused, partially unsaturated heterocyclic or heteroaromatic ring system may also be 0, $X^C$ is each, independently of one another, fluorine, chlorine, bromine, iodine, hydrogen, $C_1$-$C_{10}$-alkyl, $C_2$-$C_{10}$-alkenyl, $C_6$-$C_{20}$-aryl, $C_7$-$C_{40}$-alkylaryl, —$NR^{15C}R^{16C}$, —$OR^{15C}$, —$SR^{15C}$, —$SO_3R^{15C}$, —$OC(O)R^{15C}$, —CN, —SCN, β-diketonate, —CO, $BF_4^-$, $PF_6^-$ or a bulky noncoordinating anion, $R^{1C}$-$R^{16C}$ are each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, alkylaryl having from 1 to 10 carbon atoms in the alkyl part and 6-20 carbon atoms in the aryl part, $SiR^{17C}_3$, where the organic radicals $R^{1C}$-$R^{16C}$ may also be substituted by halogens and two geminal or vicinal radicals $R^{1C}$-$R^{16C}$ may also be joined to form a five- or six-membered ring, $R^{17C}$ is each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, and two geminal radicals $R^{17C}$ may also be joined to form a five- or six-membered ring, $n^C$ is 1, 2 or 3 and $m^C$ is 1, 2 or 3.

Chromium is particularly preferred as transition metal $M^C$.

Examples of organic transition metal compounds of the formula (V) are 1-(8-quinolyl)-2-methyl-4-methylcyclopentadienylchromium(III) dichloride, 1-(8-quinolyl)-3-isopropyl-5-methylcyclopentadienylchromium(III) dichloride, 1-(8-quinolyl)-3-tert-butyl-5-methylcyclopentadienylchromium(III) dichloride, 1-(8-quinolyl)-2,3,4,5-tetramethylcyclopentadienylchromium(III) dichloride, 1-(8-quinolyl)tetrahydroindenylchromium(III) dichloride, 1-(8-quinolyl)indenylchromium(III) dichloride, 1-(8-quinolyl)-2-methylindenylchromium(III) dichloride, 1-(8-quinolyl)-2-isopropylindenylchromium(III) dichloride, 1-(8-quinolyl)-2-ethylindenylchromium(III) dichloride, 1-(8-quinolyl)-2-tert-butylindenylchromium(III) dichloride, 1-(8-quinolyl)benzindenylchromium(III) dichloride, 1-(8-quinolyl)-2-methylbenzindenylchromium(III) dichloride, 1-(8-(2-methylquinolyl))-2-methyl-4-methylcyclopentadienylchromium(III) dichloride, 1-(8-(2-methylquinolyl))-2,3,4,5-tetramethylcyclopentadienylchromium(III) dichloride, 1-(8-(2-methylquinolyl))tetrahydroindenylchromium(III) dichloride, 1-(8-(2-methylquinolyl))indenylchromium(III) dichloride, 1-(8-(2-methylquinolyl))-2-methylindenylchromium(III) dichloride, 1-(8-(2-methylquinolyl))-2-isopropylindenylchromium(III) dichloride, 1-(8-(2-methylquinolyl))-2-ethylindenylchromium(III) dichloride, 1-(8-(2-methylquinolyl))-2-tert-butylindenylchromium(III) dichloride, 1-(8-(2-methylquinolyl))benzindenylchromium(III) dichloride and 1-(8-(2-methylquinolyl))-2-methylbenzindenylchromium (III) dichloride.

The preparation of functional cyclopentadienyl ligands has been known for a long time. Various synthetic routes for these complexing ligands have been described, for example, by M. Enders et al. in Chem. Ber. (1996), 129, 459-463 or P. Jutzi and U. Siemeling in J. Orgmet. Chem. (1995), 500, 175-185.

The metal complexes, in particular the chromium complexes, can be obtained in a simple manner by reacting the appropriate metal salts, e.g. metal chlorides, with the ligand anion (e.g. in a manner analogous to the examples in DE-A 197 10 615).

Further transition metal compounds which are suitable for the purposes of the present invention are imidochromium compounds of the formula (VI),

(VI)

where the variables have the following meanings:

$R^D$ is $R^{1D}C=NR^{2D}$, $R^{1D}C=O$, $R^{1D}C=(OR^{2D})$, $R^{1D}C=S$, $(R^{1D})_2P=O$, $(OR^{1D})_2P=O$, $SO_2R^{1D}$, $R^{1D}R^{2D}C=N$, $NR^{1D}R^{2D}$ or $BR^{1D}R^{2D}$, $C_1$-$C_{20}$-alkyl, $C_1$-$C_{20}$-cycloalkyl, $C_2$-$C_{20}$-alkenyl, $C_6$-$C_{20}$-aryl, $C_7$-$C_{40}$-alkylaryl, $X^D$ is each, independently of one another, fluorine, chlorine, bromine, iodine, —$NR^{3D}R^{4D}$, —$NP(R^{1D})_3$, —$OR^{3D}$, —$OSi(R^{3D})_3$, —$SO_3R^{3D}$, —$OC(O)R^{3D}$, β-diketonate, $BF_4^-$, $PF_6^-$ or a bulky weakly coordinating or noncoordinating anion, $R^{1D}$-$R^{4D}$ are each, independently of one another, $C_1$-$C_{20}$-alkyl, $C_2$-$C_{20}$-alkenyl, $C_6$-$C_{20}$-aryl, $C_7$-$C_{40}$-alkylaryl, hydrogen if this is bound to a carbon atom, where the organic radicals $R^{1D}$ to $R^{4D}$ may also bear inert substituents, $n^D$ is 1 or 2, $m^D$ is 1, 2 or 3 and is such that, depending on the valence of Cr, the metallocene complex of the formula (VI) is uncharged, $L^D$ is an uncharged donor and $y^D$ is from 0 to 3.

Such compounds and their preparation are described, for example, in WO 01/09148.

Further suitable organic transition metal compounds are transition metal complexes with a tridentate macrocyclic ligand, e.g.

[1,3,5-tri(methyl)-1,3,5-triazacyclohexane]chromium trichloride,

[1,3,5-tri(ethyl)-1,3,5-triazacyclohexane]chromium trichloride,

[1,3,5-tri(octyl)-1,3,5-triazacyclohexane]chromium trichloride,

[1,3,5-tri(dodecyl)-1,3,5-triazacyclohexane]chromium trichloride and

[1,3,5-tri(benzyl)-1,3,5-triazacyclohexane]chromium trichloride.

It is also possible to use mixtures of various organic transition metal compounds.

The molar ratio of organic transition metal compound to the cocatalyst comprising anions of the formula (Ia) is usually, based on anions of the formula (Ia), from 1:0.1 to 1:1000, preferably from 1:0.4 to 1:100 and in particular from 1:0.7 to 1:10.

In a preferred embodiment, the catalyst system of the present invention comprises at least one organometallic compound in addition to the cocatalyst comprising the anions of the formula (Ia) and the organic transition metal compounds. Suitable organometallic compounds are compounds of the formula (VII), $$M^2(R^6)_r(R^7)_s(R^8)_t \quad (VII)$$

where $M^2$ is an alkali metal, an alkaline earth metal or a metal of group 13 of the Periodic Table, i.e. boron, aluminum, gallium, indium or thallium, $R^6$ is hydrogen, $C_1$-$C_{10}$-alkyl, $C_6$-$C_{15}$-aryl, halogen-$C_1$-$C_{10}$-alkyl, halogen-$C_6$-$C_{15}$-aryl, $C_7$-$C_{40}$-arylalkyl, $C_7$-$C_{40}$-alkylaryl, $C_1$-$C_{10}$-alkoxyl or halogen-$C_7$-$C_{40}$-alkylaryl, halogen-$C_7$-$C_{40}$-arylalkyl or halogen-$C_1$-$C_{10}$-alkoxy, $R^7$ and $R^8$ are each hydrogen, halogen, $C_1$-$C_{10}$-alkyl, $C_6$-$C_{15}$-aryl, halogen-$C_1$-$C_{10}$-alkyl, halogen-$C_6$-$C_{15}$-aryl, $C_7$-$C_{40}$-arylalkyl, $C_7$-$C_{40}$-alkylaryl, $C_1$-$C_{10}$-alkoxyl or halogen-$C_7$-$C_{40}$-alkylaryl, halogen-$C_7$-$C_{40}$-arylalkyl or halogen-$C_1$-$C_{10}$-alkoxy, r is an integer from 1 to 3 and s and t are integers from 0 to 2, with the sum r+s+t corresponding to the valence of $M^1$.

Among the organometallic compounds of the formula (VII), preference is given to those in which $M^2$ is lithium, boron or magnesium and $R^6$, $R^7$ and $R^8$ are each $C_1$-$C_{10}$-alkyl.

Further preferred organometallic compounds of the formula (VII) are those in which $M^2$ is aluminum and r, s and t are each 1. In particularly preferred organoaluminum compounds of the formula (VII), $R^6$ is $C_1$-$C_{10}$-alkyl, in particular $C_3$-$C_{10}$-alkyl. Further particularly preferred organoaluminum compounds of the formula (VII) are ones in which $R^7$ and $R^8$ are each hydrogen, halogen or $C_1$-$C_{10}$-alkyl, in particular hydrogen or $C_3$-$C_{10}$-alkyl. Very particular preference is given to organoaluminum compounds of the formula (VII) in which $R^6$, $R^7$ and $R^8$ are identical and are each $C_3$-$C_{10}$-alkyl.

Particularly preferred metal compounds of the formula (VII) are n-butyllithium, n-butyl-n-octylmagnesium, n-butyl-n-heptylmagnesium, triphenylaluminum, triisoprenylaluminum, tri-n-octylaluminum, tri-n-hexylaluminum, tri-n-butylaluminum, triisobutylaluminum, tri-n-propylaluminum, triisopropylaluminum, triethylaluminum, trispentafluorophenylborane and trimethylaluminum and mixtures thereof.

It is also possible to use mixtures of various metal compounds of the formula (VII).

The catalyst systems of the present invention can also comprise compounds of the aluminoxane type as organometallic compounds. Such compounds are described, for example, in WO 00/31090. Particularly useful aluminoxanes are open-chain or cyclic aluminoxane compounds of the formula (VIII) or (IX)

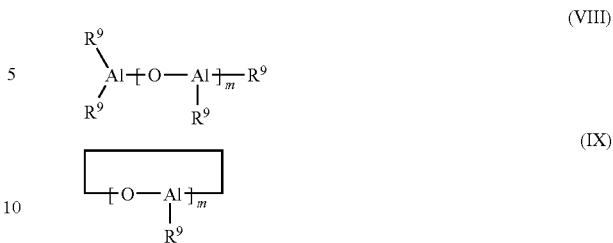

where $R^9$ is a $C_1$-$C_4$-alkyl group, preferably a methyl or ethyl group, and m is an integer from 5 to 30, preferably from 10 to 25.

These oligomeric aluminoxane compounds are usually prepared by reaction of a solution of trialkylaluminum with water. In general, the oligomeric aluminoxane compounds obtained in this way are in the form of mixtures of both linear and cyclic chain molecules of various lengths, so that m is to be regarded as a mean. The aluminoxane compounds can also be present in admixture with other metal alkyls, usually aluminum alkyls.

Furthermore, modified aluminoxanes in which some of the hydrocarbon radicals or hydrogen atoms have been replaced by alkoxy, aryloxy, siloxy or amide radicals can also be used in place of the aluminoxane compounds of the formula (VIII) or (IX).

It is also possible to use mixtures of aluminoxane compounds with one or more of the metal compounds of the formula (VII).

When an organometallic compound is used, the molar ratio of organometallic compound, based on metal atoms of the organometallic compound, to organic transition metal compound is generally from 800:1 to 1:1, preferably from 200:1 to 2:1.

In a preferred embodiment, the catalyst system of the present invention further comprises an inorganic or organic support. Suitable supports are inert solids. In particular, the support can be a porous support such as talc, a sheet silicate, an inorganic oxide or a finely divided polymer powder.

Inorganic oxides suitable as supports may be found among the oxides of elements of groups 2, 3, 4, 5, 13, 14, 15 and 16 of the Periodic Table of the Elements. Preference is given to oxides or mixed oxides of the elements calcium, aluminum, silicon, magnesium or titanium and also corresponding oxide mixtures. Other inorganic oxides which can be used alone or in combination with the abovementioned preferred oxidic supports are, for example, $ZrO_2$ or $B_2O_3$. Preferred oxides are silicon dioxide, particularly in the form of a silica gel or a pyrogenic silica, and aluminum oxide. A preferred mixed oxide is, for example, calcined hydrotalcite.

The support materials used preferably have a specific surface area in the range from 10 to 1 000 m²/g, preferably from 50 to 500 m²/g and in particular from 200 to 400 m²/g, and a pore volume in the range from 0.1 to 5 ml/g, preferably from 0.5 to 3.5 ml/g and in particular from 0.8 to 3.0 ml/g. The mean particle size of the finely divided supports is generally in the range from 1 to 500 µm, preferably from 5 to 350 µm and in particular from 10 to 100 µm.

The inorganic support can be subjected to a thermal treatment, e.g. to remove adsorbed water. Such a drying treatment is generally carried out at from 80 to 300° C., preferably from 100 to 200° C., with drying preferably being carried out under reduced pressure and/or in a stream of inert gas, for example nitrogen or argon. The inorganic support can also be calcined at from 200 to 1000° C. to set the concentration of the OH groups on the surface and possibly alter the structure of the solid. Furthermore, the support can be treated chemically using customary desiccants such as metal alkyls, preferably aluminum alkyls, chlorosilanes or $SiCl_4$, or else methylaluminoxane. Appropriate treatment methods are described, for example, in WO 00/31090.

The inorganic support material can also be chemically modified. For example, the treatment of silica gel with $NH_4SiF_6$ leads to fluorination of the silica gel surface, or treatment of silica gels with silanes containing nitrogen-, fluorine- or sulfur-containing groups leads to correspondingly modified silica gel surfaces.

Further possible support materials are finely divided polymer powders, for example powders comprising polyolefins such as polyethylene or polypropylene or polystyrene. These are preferably functionalized polymer supports, e.g. supports based on polystyrenes via whose functional groups, for example ammonium or hydroxyl groups, the aluminoxane can be immobilized. They should preferably be freed of adhering moisture, solvent residues or other impurities by means of appropriate purification or drying operations before use.

Preference is given to using finely divided supports which have functional groups on their surface. Preferred functional groups are groups containing active hydrogen. Examples of suitable functional groups are hydroxyl groups, primary and secondary amino groups, mercapto groups, silanol groups, carboxyl groups, amido groups and imido groups, with hydroxyl groups being particularly preferred.

In the preparation of the catalyst systems of the present invention, the components can be brought into contact with one another in any order. It is usual to bring the cocatalyst comprising the anions of the formula (Ia), the organic transition metal compound and, if appropriate, the organometallic compound into contact with one another first before the mixture is used for the polymerization.

In the preparation of supported catalyst systems, the cocatalyst comprising the anions of the formula (Ia) and the organic transition metal compound are firstly immobilized on the support and the catalyst solid obtained in this way is used for the polymerization.

In a preferred process for preparing the catalyst systems of the present invention, a support material, in particular silica gel, is firstly brought into contact with an organometallic compound, preferably a trialkylaluminum and very particularly preferably triisobutylaluminum. In a particularly preferred embodiment of the process, the solid is subsequently washed and dried. The modified support is subsequently combined with the organic transition metal compound and the cocatalyst comprising the anions of the formula (Ia).

In a particularly preferred embodiment of this process, the organic transition metal compound is firstly combined with an organometallic compound such as a trialkylaluminum before it is brought into contact with the cocatalyst and only then is it combined with the cocatalyst comprising the anions of the formula (Ia).

In another particularly preferred embodiment of the process, the mixture of modified support, the cocatalyst comprising the anions of the formula (Ia) and organic transition metal compound is reacted and dried without a further organometallic compound being added, resulting in formation of a catalyst solid. The catalyst solid obtained is then brought into contact with an organometallic compound such as a trialkylaluminum shortly before or during the polymerization.

The components are usually combined in the presence of an organic solvent in which the support, the reaction products of the supports and the catalyst solid formed are suspended. Suitable solvents include aromatic or aliphatic solvents such as hexane, heptane, toluene or xylene and halogenated hydrocarbons such as methylene chloride and halogenated aromatic hydrocarbons such as o-dichlorobenzene.

The components are generally combined at from −20° C. to 150° C., preferably from 0° C. to 80° C. The time for which the components which have been brought into contact with one another are allowed to react is generally from 1 minute to 48 hours. Preference is given to reaction times of from 10 minutes to 6 hours.

In the preparation of a supported catalyst system, it is also possible for the catalyst solid firstly to be prepolymerized with α-olefins, preferably linear $C_2$-$C_{10}$-1-alkenes and in particular ethylene or propylene, and the resulting prepolymerized catalyst solid then to be used in the actual polymerization. The mass ratio of catalyst solid used in the prepolymerization to monomer polymerized onto it is usually in the range from 1:0.1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of the supported catalyst system. The molar ratio of additives to organic transition metal compound D) is usually from 1:1 000 to 1 000:1, preferably from 1:5 to 20:1.

The polymerization can be carried out in a known manner in bulk, in suspension, in the gas phase or in a supercritical medium in the customary reactors used for the polymerization of olefins. This can be carried out batchwise or preferably continuously in one or more stages. Solution processes, suspension processes, stirred gas-phase processes and gas-phase fluidized-bed processes are all possible. As solvent or suspension medium, it is possible to use inert hydrocarbons, for example isobutene, or else the monomers themselves.

The polymerizations can be carried out at from −60 to 300° C. and pressures in the range from 0.5 to 3 000 bar. Preference is given to temperatures in the range from 50 to 200° C., in particular from 60 to 100° C., and pressures in the range from 5 to 100 bar, in particular from 15 to 70 bar. The mean residence times are usually from 0.5 to 5 hours, preferably from 0.5 to 3 hours. Molar mass regulators, for example hydrogen, or customary additives such as antistatics can also be used in the polymerization.

The invention is illustrated by the following nonlimiting examples:

EXAMPLES

General

All syntheses and polymerizations were carried out under an argon gas atmosphere. All solvents required were purged with argon and dried over molecular sieves before use.

To characterize the samples, the following tests were carried out:

Determination of the limiting viscosity [η]:

The determination of the limiting viscosity, which indicates the limit of the viscosity number on extrapolation of the polymer concentration to zero, was carried out using an automatic Ubbelohde viscometer (Lauda PVS 1) using decalin as solvent at 130° C. in accordance with ISO 1628.

Determination of the molar mass distribution:

Gel permeation chromatography (GPC) was carried out at 140° C. in 1,2,4-trichlorobenzene using a 150C GPC apparatus from Waters. Evaluation of the data was carried out using the software Win-GPC from HS-Entwicklungsgesellschaft für wissenschaftliche Hard-und Software mbH, Ober-Hilbersheim. Calibration of the columns was carried out by means of polyethylene standards having molar masses from 100 to $10^7$ g/mol. The mass average molar mass ($M_w$) and number average molar mass ($M''$) of the polymers and the ratio of mass average to number average ($M_w/M_n$)=Q were determined.

Determination of the number of methyl side chains and the density by means of IR spectroscopy: IR spectra were measured on 0.1 mm thick PE films which had been produced by pressing at 180° C. for 15 minutes. The number of methyl side chains per 1000 carbon atoms of the polymer chain ($CH_3$/1000) was determined by IR in accordance with ASTM D 6248-98. The density of the polymer samples was determined by IR spectroscopy via a chemical calibration of IR spectra versus density determined by the buoyancy method in accordance with ISO 1183.

Abbreviations in the following tables:
[η] limiting viscosity
t(poly) polymerization time
polymer amount of polymer formed
density polymer density
activity productivity of the catalyst in g of polymer obtained per mmol of organic transition metal compound (complex) per hour
LiAl LiAl(OC(CF$_3$)$_3$)$_4$ As organic transition metal compound, the following complexes A, B, C and D were used:
A: [2,6-Diacetylpyridine bis(2,4-dichloro-6-methylanil)] iron dichloride:
2,6-diacetylpyridine bis(2-chloro-6-methylanil) was prepared as in ex. 2 of WO 98/27124 and reacted analogously with iron(II) chloride to give [2,6-diacetylpyridine bis(2-chloro-6-methylanil)]iron dichloride, as likewise disclosed in WO 98/27124.
B: [2-Methyl-3-(4-benzotrifluoride)-1-(8-quinolyl)cyclopentadienyl]chromium dichloride
[2-Methyl-3-(4-benzotrifluoride)-1-(8-quinolyl)cyclopentadienyl]chromium dichloride was prepared as described in ex. 2 of LU6148.
C: [1,2,3-Tridodecyl-1,3,5-triazacyclohexane]chromium trichloride
[1,2,3-Tridodecyl-1,3,5-triazacyclohexane]chromium trichloride was prepared as disclosed in ex. 12 of WO 00/58370.
D: Me$_2$Si-(2-Me-4,5-benzoind)$_2$ZrCl$_2$
Me$_2$Si-(2-Me-4,5-benzoind)$_2$ZrCl$_2$ was prepared as disclosed in EP549900.

Preparation of LiAl(OC(CF$_3$)$_3$)$_4$ (LiAl)
LiAl(OC(CF$_3$)$_3$)$_4$ was prepared by the method described in 1. Krossing, Chem. Eur. J. 2001, 7, 490.

Polymerization

The polymerization tests were carried out in a 1 l four-necked flask provided with contact thermometer, Teflon blade stirrer, gas inlet tube, condenser and heating mantel. 250 ml of toluene were placed in this flask, and the appropriate amounts of the complex and LiAl(OC(CF$_3$)$_3$)$_4$ were added under argon at 40° C. The solution was then heated at 75° C. for 10 minutes and subsequently cooled back down to 40° C. and admixed with the appropriate amount of 2 molar TIBAL solution in heptane from Crompton (triisobutylaluminum), as indicated in table 1. From 10 to 40 l/h of ethylene were passed through this solution according to consumption.

To stop the polymerization, the introduction of ethylene was stopped and argon was passed through the solution. The TIBAL was then completely decomposed by addition of a mixture of 15 ml of concentrated hydrochloric acid and 50 ml of methanol. After stirring for 15 minutes, 250 ml of methanol were added, with all of the polymer formed precipitating. The polymer was filtered off via a glass filter frit, washed three times with methanol and dried at 70° C. under reduced pressure. The polymerization and product data are summarized in table 1.

TABLE 1

| Example | Complex μmol | LiAl μmol | Complex: LiAl: TIBAL | t(poly) [min] | Polymer [g] | Activity kgPE/ (mol*h) | [η] [dl/g] | $M_w$ | Q |
|---|---|---|---|---|---|---|---|---|---|
| 1 | A 14.0 | 29 | 1: 2.07: 50 | 9 | 3.6 | 1714 | 0.48 | 23502 | 6.8 |
| 2 | B 11.8 | 21.9 | 1: 1.85: 50 | 20 | 4.25 | 1078 | 12 | 1717156 | 25 |
| 3 | C 26.2 | 53.8 | 1: 2.05: 50 | 40 | 2.7 | 103 | 0.17 | — | — |
| 4 | D 12 | 25 | 1: 2.1: 50 | 15 | 3.2 | 1070 | 5.34 | 604846 | 3.4 |

Supported Catalyst Example 1

Application of complex D together with the cocatalyst LiAl(OC(CF$_3$)$_3$)$_4$ to silica gel deactivated with triisobutylaluminum (TIBAL) as support 50 g of silica gel (Sylopol 2107 from Grace) were deactivated by addition of 140 mmol of TIBAL in heptane (2.8 mmol of TIBAL/g of SiO$_2$) at room temperature, filtered off and dried.

154 mg of complex D (267 μmol) and 520 mg (534 μmol) of LiAl(OC(CF$_3$)$_3$)$_4$ were suspended in 25 ml of toluene and stirred at room temperature for 45 minutes and at 75° C. for 15 minutes. The ratio of Zr to LiAl was 1:2.

5.0 g of deactivated silica gel Sylopol 2107 were admixed with the above solution and the mixture was stirred at room temperature for 30 minutes. The solvent was subsequently removed at 40° C. under reduced pressure. A free-flowing catalyst powder was obtained.

Supported Catalyst Example 2

The application of complex A to a support was carried out by a method analogous to supported catalyst example 1. 45.1 mg of complex A (74.4 μmol) were suspended in 20 ml of toluene. 147.8 mg of LiAl(OC(CF$_3$)$_3$)$_4$ (151.7 μmol) were added to this suspension and the mixture was stirred at RT for 15 minutes. The ratio of Fe to LiAl was 1:2.

5.0 g of deactivated silica gel Sylopol 2107 were admixed with the above solution and stirred at room temperature for 30 minutes. The solvent was subsequently removed at 40° C. under reduced pressure. A free-flowing catalyst powder was obtained.

Polymerization Examples 5-7

70 g of polyethylene powder (particle size >1 mm; baked at 80° C. for 6 hours) were placed in a 1 l steel autoclave which had been made inert by means of argon and admixed with 160 mg of TIBAL (TIBAL in heptane; 100 mg/ml) and 40 ml of isobutane. After the internal temperature of the autoclave had been brought to 90° C., the appropriate amount of supported catalyst was introduced via a lock, and this lock and the catalyst container were rinsed with 3-4 ml of heptane. 10 bar of ethylene and 9 bar of argon were then injected via a lock. This total pressure of 19 bar was automatically maintained during the polymerization by addition of further ethylene. After one hour, the polymerization was stopped by venting. The product was separated from the initial charge of coarse PE by sieving.

The further data on the polymerization conditions and the product properties are shown in table 2.

TABLE 2

| | Ex. 5 | Ex. 6 | Ex. 7 |
|---|---|---|---|
| Complex | D | D | A |
| Weight of catalyst [mg] | 460 | 460 | 883 |
| t(poly) [min] | 60 | 60 | 60 |
| Pressure [bar] | 19 | 19 | 19 |
| TIBAL [mg] | 480 | 640 | 480 |
| Polymer [g] | 7 | 7 | 46 |
| Productivity g of PE/g of cat. | 15 | 15 | 52 |
| [η] [d/g] | 3.20 | 3.90 | 0.7 |
| IR density [g/cm$^3$] | 0.9338 | 0.9368 | 0.9629 |
| IR (CH$_3$/1000C) | 0.8 | 1 | 4.4 |

I claim:
1. A catalyst system for olefin polymerization comprising:
an organic transition metal compound selected from the group consisting of transition metal complexes with at least one ligand of the formulae (IVa) to (IVe):

(IVa)

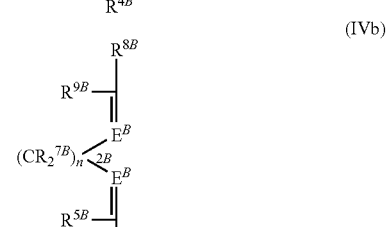

(IVb)

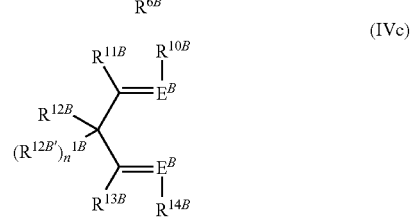

(IVc)

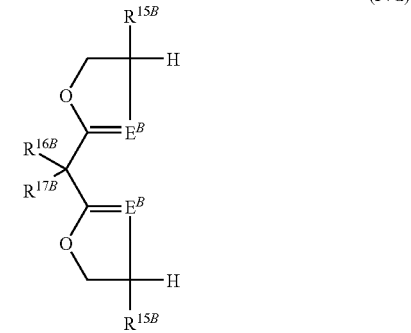

(IVd)

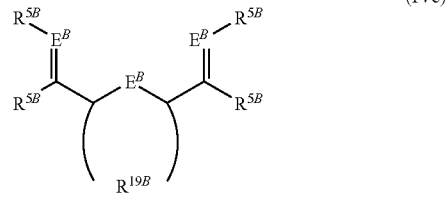

(IVe)

where the transition metal is selected from the group consisting of Ti, Zr, Hf, Sc, V, Nb, Ta, Cr, Mo, W, Fe, Co, Ni, Pd, Pt and the elements of the rare earth metals, $E^B$, identical or different, is an element of group 15 of the Periodic Table of the Elements, $R^{1B}$ and $R^{4B}$ are each, independently of one another, a hydrocarbon radical or a substituted hydrocarbon radical, $R^{2B}$ and $R^{3B}$ are each, independently of one another, hydrogen, a hydrocarbon radical or a substituted hydrocarbon radical, where $R^{2B}$ and $R^{3B}$ may optionally form a ring system optionally containing at least one heteroatom, $R^{6B}$ and $R^{8B}$ are each, independently of one another, a hydrocarbon radical or a substituted hydrocarbon radical, $R^{5B}$ and $R^{9B}$ are each, independently of one another, hydrogen, a hydrocarbon radical or a substituted hydrocarbon radical, where $R^{6B}$ and $R^{5B}$ or $R^{8B}$ and $R^{9B}$ may together form a ring system, $R^{7B}$ are each, independently of one another, hydrogen, a hydrocarbon radical or a substituted hydrocarbon radical, where two radicals $R^{7A}$ may optionally form a ring system, $R^{10B}$ and $R^{14B}$ are each, independently of one another, a hydrocarbon radical or a substituted hydrocarbon radical, $R^{11B}$, $R^{12B}$, $R^{12B'}$ and $R^{13B}$ are each, independently of one another, hydrogen, a hydrocarbon radical or a substituted hydrocarbon radical, where two or more geminal or vicinal radicals $R^{11B}$, $R^{12B}$, $R^{12B'}$ and $R^{13B}$ may optionally form a ring system, $R^{15B}$ is hydrogen, a hydrocarbon radical or a substituted hydrocarbon radical, $R^{16B}$ and $R^{17B}$ are each, independently of one another, hydrogen, a hydrocarbon radical or a substituted hydrocarbon radical, $R^{19B}$ is an organic radical which forms a 5- to 7-membered substituted or unsubstituted heterocyclic ring system, $n^{1B}$ is 0 or 1, with the compounds of the formula (IVc) being negatively charged when $n^{1B}$ is 0, and $n^{2B}$ is an integer from 1 to 4, heterocyclopentadienyl complexes of the formula (v):

$$[Z^C{-}M^C{-}X^C_n]_m{}^C \qquad (V),$$

where $M^C$ is chromium, molybdenum or tungsten, and $Z^C$ has the formula (Va):

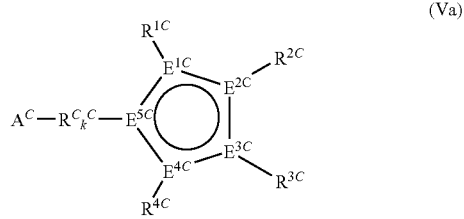

(Va)

where:

$E^{1C}$-$E^{5C}$ are each carbon or not more than one atom $E^{1C}$ to $E^{5C}$ is phosphorus or nitrogen, $A^C$ is —$NR^{5C}R^{6C}$, —$PR^{5C}R^{6C}$, —$OR^{5C}$, —$SR^{5C}$ or an unsubstituted, substituted or fused, partially unsaturated heterocyclic or heteroaromatic ring system, $R^C$ is one of the following groups:

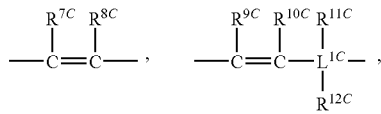

and, if $A^C$ is an unsubstituted, substituted or fused, partially unsaturated heterocyclic or heteroaromatic ring system, may also be

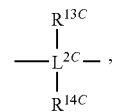

where $L^{1C}$, $L^{2C}$ are each silicon or carbon, $k^C$ is 1 or when $A^{1C}$ is an unsubstituted, substituted or fused, partially unsaturated heterocyclic or heteroaromatic ring system is 0, $X^C$ is each, independently of one another, fluorine, chlorine, bromine, iodine, hydrogen, $C_1$-$C_{10}$-alkyl, $C_2$-$C_{10}$-alkenyl, $C_6$-$C_{20}$-aryl, $C_7$-$C_{40}$-alkylaryl, —$NR^{15C}R^{16C}$, $OR^{15C}$, —$SR^{15C}$, —$SO_3R^{15C}$, —$OC(O)R^{15C}$, —$CN$, —$SCN$, β-diketonate, —$CO$, $BF_4^-$, $PF_6^-$ or a bulky noncoordinating anion, $R^{1C}$-$R^{16C}$ are each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, alkylaryl having from 1 to 10 carbon atoms in the alkyl part and 6-20 carbon atoms in the aryl part, $SiR^{17C}{}_3$, where the organic radicals $R^{1C}$-$R^{16C}$ may optionally be substituted by halogens and two geminal or vicinal radicals $R^{1C}$-$R^{16C}$ may optionally be joined to form a five- or six-membered ring, $R^{17C}$ is each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, and two geminal radicals $R^{17C}$ may optionally be joined to form a five- or six-membered ring, $n^C$ is 1, 2 or 3 and $m^C$ is 1, 2 or 3, imidochromium compounds of the formula (VI):

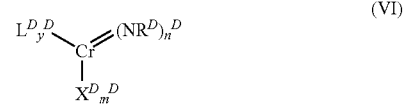

(VI)

where:

$R^D$ is $R^{1D}C{=}NR^{2D}$, $R^{1D}C{=}O$, $R^{1D}C{=}(OR^{2D})$, $R^{1D}C{=}S$, $(R^{1D})_2P{=}O$, $(OR^{1D})_2P{=}O$, $SO_2R^{1D}$, $R^{1D}R^{2D}C{=}N$, $NR^{1D}R^{2D}$, $BR^{1D}R^{2D}$, $C_1$-$C_{20}$-alkyl, $C_1$-$C_{20}$-cycloalkyl, $C_2$-$C_{20}$-alkenyl, $C_6$-$C_{20}$-aryl, or $C_7$-$C_{40}$-alkylaryl, $X^D$ is each, independently of one another, fluorine, chlorine, bromine, iodine, —$NR^{3D}R^{4D}$, —$NP(R^{3D})_3$, —$OR^{3D}$, —$OSi(R^{3D})_3$, —$SO_3R^{3D}$, —$OC(O)R^{3D}$, β-diketonate, $BF_4^-$, $PF_6^-$ or a bulky weakly coordinating or noncoordinating anion, $R^{1D}$-$R^{4D}$ are each, independently of one another, $C_1$-$C_{20}$-alkyl, $C_2$-$C_{20}$-alkenyl, $C_6$-$C_{20}$-aryl, $C_7$-$C_{40}$-alkylaryl or hydrogen if bound to a carbon atom, where the organic radicals $R^{1D}$ to $R^{4D}$ may optionally bear inert substituents, $n^D$ is 1 or 2, $m^D$ is 1, 2 or 3, $L^D$ is an uncharged donor and $y^D$ is from 0 to 3,

[1,3,5-tri(methyl)-1,3,5-triazacyclohexane]chromium trichloride,

[1,3,5-tri(ethyl)-1,3,5-triazacyclohexane]chromium trichloride,

[1,3,5-tri(octyl)-1,3,5-triazacyclohexane]chromium trichloride,

[1,3,5-tri(dodecyl)-1,3,5-triazacyclohexane]chromium trichloride and

[1,3,5-tri(benzyl)-1,3,5-triazacyclohexane]chromium trichloride;

a cocatalyst comprising:

an ionic compound made up of anions of the formula (Ia), $$[Al(OR^1)_4]^- \quad \text{(Ia)}$$

where the radicals $R^1$ are each $C(CF_3)_3$;

$Li^+$ as a cation; and an inorganic or organic support.

2. The catalyst system as claimed in claim 1 which further comprises an organometallic compound.

3. A process for preparing the catalyst system of claim 2 comprising:

firstly bringing the support into contact with the organometallic compound, thereby forming a reaction product and adding the organic transition metal compound and the cocatalyst to the reaction product.

4. A catalyst system for the polymerization of olefins comprising:

an organic transition metal compound selected from the group consisting of transition metal complexes with at least one ligand of the formulae (IVa) to (IVe):

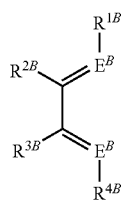
(IVa)

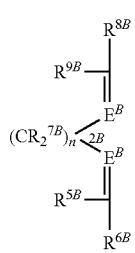
(IVb)

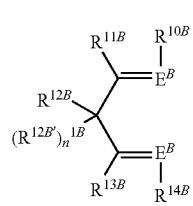
(IVc)

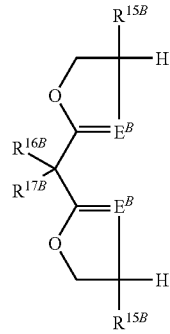
(IVd)

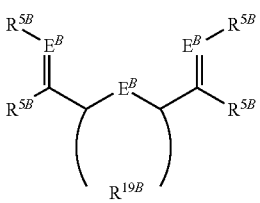
(IVe)

where the transition metal is selected from the group consisting of Ti, Zr, Hf, Sc, V, Nb, Ta, Cr, Mo, W, Fe, Co, Ni, Pd, Pt and the elements of the rare earth metals, $E^B$, identical or different, is an element of group 15 of the Periodic Table of the Elements, $R^{1B}$ and $R^{4B}$ are each, independently of one another, a hydrocarbon radical or a substituted hydrocarbon radical $R^{2B}$ and $R^{3B}$ are each, independently of one another, hydrogen, a hydrocarbon radical or a substituted hydrocarbon radical, where $R^{2B}$ and $R^{3B}$ may optionally form a ring system optionally containing at least one heteroatom, $R^{6B}$ and $R^{8B}$ are each, independently of one another, a hydrocarbon radical or a substituted hydrocarbon radical, $R^{5B}$ and $R^{9B}$ are each, independently of one another, hydrogen, a hydrocarbon radical or a substituted hydrocarbon radical, where $R^{6B}$ and $R^{5B}$ or $R^{8B}$ and $R^{9B}$ may together form a ring system, $R^{7B}$ are each, independently of one another, hydrogen, a hydrocarbon radical or a substituted hydrocarbon radical, where two radicals $R^{7A}$ may optionally form a ring system, $R^{10B}$ and $R^{14B}$ are each, independently of one another, a hydrocarbon radical or a substituted hydrocarbon radical, $R^{11B}$, $R^{12B}$, $R^{12B'}$ and $R^{13B}$ are each, independently of one another, hydrogen, a hydrocarbon radical or a substituted hydrocarbon radical, where two or more geminal or vicinal radicals $R^{11B}$, $R^{12B}$, $R^{12B'}$ and $R^{13B}$ may optionally form a ring system, $R^{15B}$ hydrogen, a hydrocarbon radical or a substituted hydrocarbon radical, $R^{16B}$ and $R^{17B}$ are each, independently of one another, hydrogen, a hydrocarbon radical or a substituted hydrocarbon radical, $R^{19B}$ is an organic radical which forms a 5- to 7-membered substituted or unsubstituted heterocyclic ring system, $n^{1B}$ is 0 or 1, with the compounds of the formula (IVc) being negatively charged when $n^{1B}$ is 0, and $n^{2B}$ is an integer from 1 to 4, heterocyclopentadienyl complexes of the formula (V):

$$[Z^C\!-\!M^C\!-\!X^C_{n^C}] \quad (V),$$

where
$M^C$ is chromium, molybdenum or tungsten, and
$Z^C$ has the formula (Va):

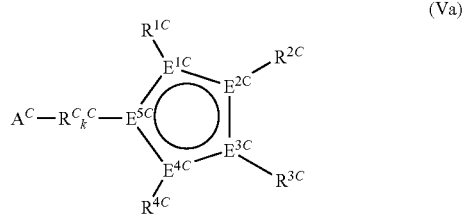
(Va)

where:
$E^{1C}\text{-}E^{5C}$ are each carbon or not more than one atom $E^{1C}$ to $E^{5C}$ is phosphorus or nitrogen,
$A^C$ is $-\!NR^{5C}R^{6C}$, $-\!PR^{5C}R^{6C}$, $-\!OR^{5C}$, $-\!SR^{5C}$ or an unsubstituted, substituted or fused, partially unsaturated heterocyclic or heteroaromatic ring system,
$R^C$ is one of the following groups:

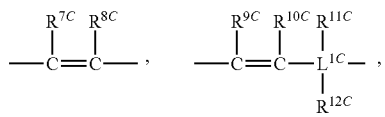

and, if $A^C$ is an unsubstituted, substituted or fused, partially unsaturated heterocyclic or heteroaromatic ring system, may also be

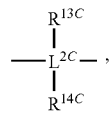

where
$L^{1C}$, $L^{2C}$ are each silicon or carbon,
$k^C$ is 1 or when $A^{1C}$ is an unsubstituted, substituted or fused, partially unsaturated heterocyclic or heteroaroratic ring system is 0,
$X^C$ is each, independently of one another, fluorine, chlorine, bromine, iodine, hydrogen, $C_1$-$C_{10}$-alkyl, $C_2$-$C_{10}$-alkenyl, $C_6$-$C_{20}$-aryl, $C_7$-$C_{40}$-alkylaryl, $NR^{15C}R^{16C}$, $-\!OR^{15C}$, $-\!SR^{15C}$, $-\!SO_3R^{15C}$, $-\!OC(O)R^{15C}$, $-\!CN$, $-\!SCN$, β-diketonate, $-\!CO$, $BF_4^-$, $PF_6^-$ or a bulky noncoordinating anion,
$R^{1C}$-$R^{16C}$ are each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, alkylaryl having from 1 to 10 carbon atoms in the alkyl part and 6-20 carbon atoms in the aryl part, $SiR^{17C}_3$, where the organic radicals $R^{1C}$-$R^{16C}$ may optionally be substituted by halogens and two geminal or vicinal radicals $R^{1C}$-$R^{16C}$ may optionally be joined to form a five- or six-membered ring, $R^{17C}$ is each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, and two geminal radicals $R^{17C}$ may optionally be joined to form a five- or six-membered ring,
$n^C$ is 1, 2 or 3 and
$m^C$ is 1, 2 or 3,
imidochromium compounds of the formula (VI):

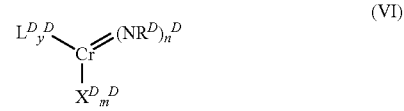
(VI)

where:
$R^D$ is $R^{1D}C\!=\!NR^{2D}$, $R^{1D}C\!=\!O$, $R^{1D}C\!=\!(OR^{2D})$, $R^{1D}C\!=\!S$, $(R^{1D})_2P\!=\!O$, $(OR^{1D})_2P\!=\!O$, $SO_2R^{1D}$, $R^{1D}R^{2D}C\!=\!N$, $NR^{1D}R^{2D}$, $BR^{1D}R^{2D}$, $C_1$-$C_{20}$-alkyl, $C_1$-$C_{20}$-cycloalkyl, $C_2$-$C_{20}$-alkenyl, $C_6$-$C_{20}$-aryl, or $C_7$-$C_{40}$-alkylaryl,
$X^D$ is each, independently of one another, fluorine, chlorine, bromine, iodine, $-\!NR^{3D}R^{4D}$, $-\!NP(R^{3D})_3$, $-\!OR^{3D}$, $-\!OSi(R^{3D})_3$, $SO_3R^{3D}$, $-\!OC(O)R^{3D}$, β-diketonate, $BF_4^-$, $PF_6^-$ or a bulky weakly coordinating or noncoordinating anion,
$R^{1D}$-$R^{4D}$ are each, independently of one another, $C_1$-$C_{20}$-alkyl, $C_2$-$C_{20}$-alkenyl, $C_6$-$C_{20}$-aryl, $C_7$-$C_{40}$-alkylaryl or hydrogen if bound to a carbon atom, where the organic radicals $R^{1D}$ to $R^{4D}$ may optionally bear inert substituents,
$n^D$ is 1 or 2,
$m^D$ is 1 or 2,
$L^D$ is an uncharged donor and
$y^D$ is from 0 to 3,
[1,3,5-tri(methyl)-1,3,5-triazacyclohexane]chromium trichloride,
[1,3,5-tri(ethyl)-1,3,5-triazacyclohexane]chromium trichloride,
[1,3,5-tri(octyl)-1,3,5-triazacyclohexane]chromium trichloride,
[1,3,5-tri(dodecyl)-1,3,5-triazacyclohexane]chromium trichloride and
[1,3,5-tri(benzyl)-1,3,5-triazacyclohexane]chromium trichloride;
an organometallic compound; a cocatalyst comprising an ionic compound made up of anions of the formula (Ia):

$$[Al(OR^1)_4]^- \quad (Ia)$$

where the radicals $R^1$ are each $C(CF_3)_3$;
$L^+$ as a cation; and
an inorganic or organic support
which is obtained by a process comprising firstly bringing the support into contact with an organometallic compound, thereby forming a reaction product and adding the organic transition metal compound and the cocatalyst to the reaction product.

5. A process comprising polymerizing olefins with the catalyst system of claim 1.

\* \* \* \* \*